March 20, 1934.  E. C. GUISINGER  1,951,868
PROCESS FOR THE DECORATION OF CERAMIC WARE
Filed July 25, 1932
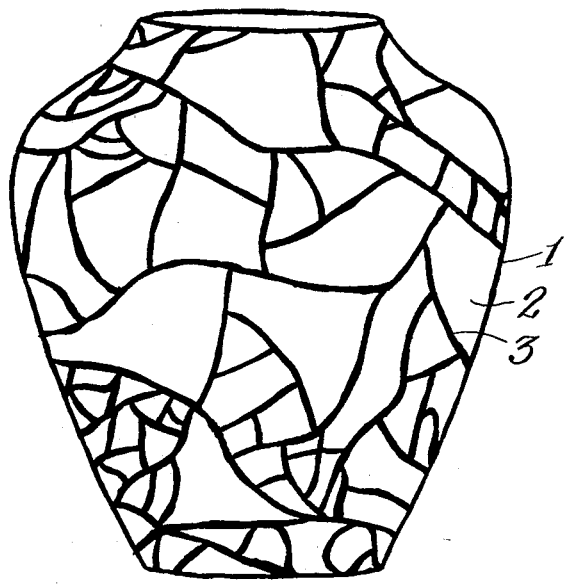
INVENTOR
Earl Chalmers Guisinger Patented Mar. 20, 1934

1,951,868

UNITED STATES PATENT OFFICE 1,951,868

PROCESS FOR THE DECORATION OF CERAMIC WARE

Earl Chalmers Guisinger, Gibsonburg, Ohio

Application July 25, 1932, Serial No. 624,647

2 Claims. (Cl. 41—30)

This invention relates to the decoration of ceramic ware by utilizing to an advantage a certain phenomena known as "crazing." Said "crazing" is a ceramic term applied to the lack of harmony between a glaze and the body to which it is attached, a tension in said glaze causing it to break up into variable sized pieces or sections. This so-called crazing causes the surface of the ceramic piece to become covered, either wholly or partially, with variable sized cracks or lines of infinite design. These said craze cracks or lines present an open section in the glaze leading directly or indirectly to the porous body beneath.

To obtain the proposed ceramic decoration, the ware is processed thru a series of firings, the temperatures of these firings being so arranged as to cause craze lines to occur due to the immaturity of both the glaze and the body to which it is attached. The glaze in which the craze cracks occur will hereafter be referred to as the base glaze. For example: A piece of unfired, unglazed ceramic ware is subjected to heat treatment, the temperature employed in said heat treatment to be below that temperature at which the body becomes mature. A glaze is then applied to said ceramic piece and a second firing accomplished at a temperature below the maturing temperatures of both the glaze and the body to which it is attached. Craze lines will occur because neither the body nor the glaze have been fired to their maturing temperatures or that temperature of heat treatment which renders them in harmony, the one with the other. These said craze lines are then filled, wholly or partially, over the entire surface or any portion thereof, by coating, dipping, spraying, or impregnating them with another glaze which fires to a color different than the color of the base glaze or body. Said ceramic piece is then fired to the maturing temperature of both the base glaze and the body to which it is attached, thereby producing a technically perfect ceramic piece devoid of craze lines such as those which appeared at the lower temperatures. A form of the decoration is illustrated in the accompanying drawing wherein a body 1 is provided with a crazed glaze coat 2, the craze lines 3 being filled with a glaze differing in color from that of the coat 2, whereafter the body 1 is fired to its maturing temperature and the maturing temperature of the crazed glaze coat 2. The lines forming the decoration are a composite part of the glazed surface and act independently of the body insofar as color is concerned. In those cases where dye or colorant is applied to the craze lines, the porous body beneath absorbs the coloring matter, therefore the body supplies the basis, whereas in this process the color is a component part of the glaze itself. Also in those cases where dye or coloring matter is used, the surface is technically imperfect, retaining a broken, immature surface, covered with cracks which lead to the porous body beneath. In the process herein proposed the final product is technically perfect, having no craze lines appearing after the final firing so far as technically possible to prohibit them. In the dye process the color is produced by penetration into the body whereas in this process the color is effected in the glazed surface itself.

I claim:

1. The process of decorating ceramic ware having first an unfired body and thereafter an unfired glaze coat, consisting in subjecting said ware to temperatures below the maturing temperatures of the body and glaze composing said ware, filling, with another glaze, the craze lines which result from such a treatment, and the final firing of the ware to the maturing temperatures of the body and glaze composing said ware.

2. The process of decorating ceramic ware having first an unfired body and thereafter an unfired glaze coat, consisting in subjecting said ware to temperatures below the maturing temperatures of the body and glaze composing said ware, filling, with another glaze, any portion of the craze lines which result from such a treatment, and the final firing of the ware to the maturing temperatures of the body and glaze composing said ware.

EARL CHALMERS GUISINGER.